Dec. 10, 1940.   R. J. PARSONS   2,224,830
VEHICLE HEATING
Original Filed Nov. 24, 1934   2 Sheets-Sheet 1
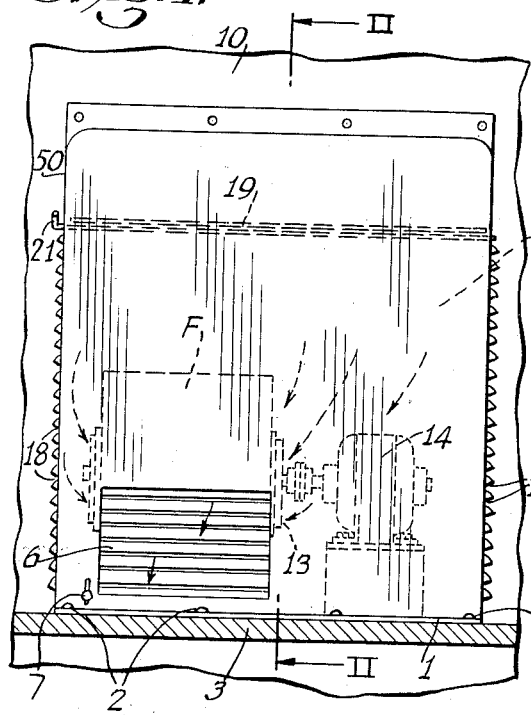
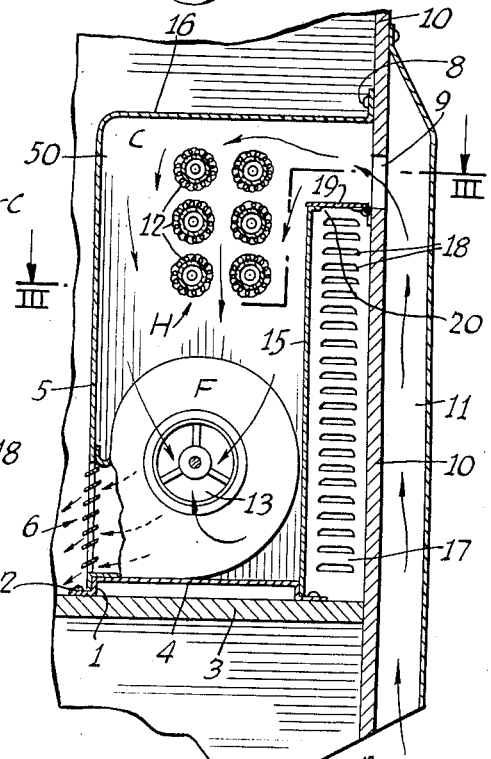
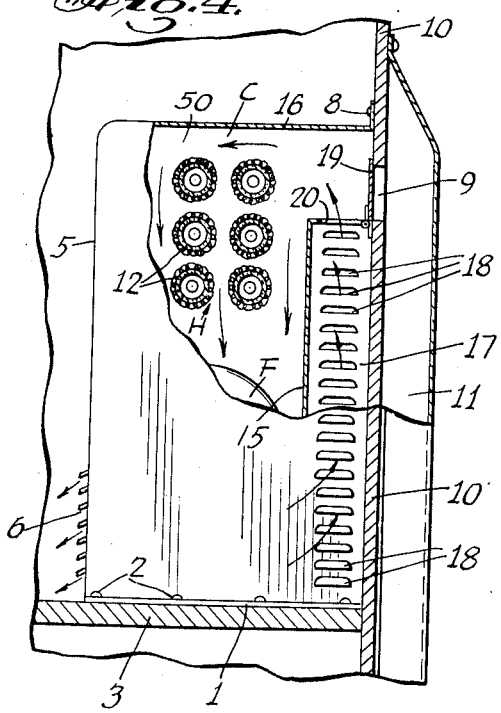
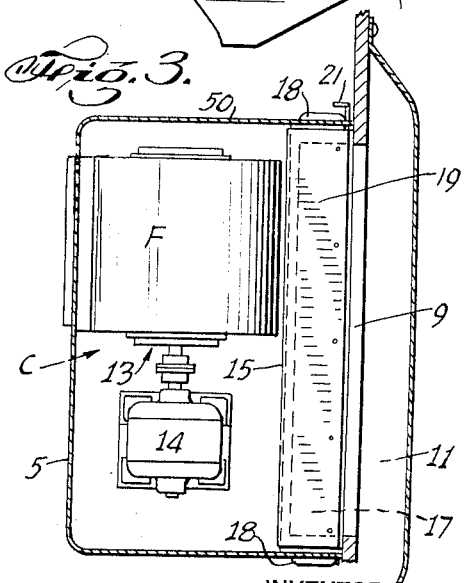
INVENTOR
Robert J. Parsons
BY
Lyman E. Dodge
ATTORNEY

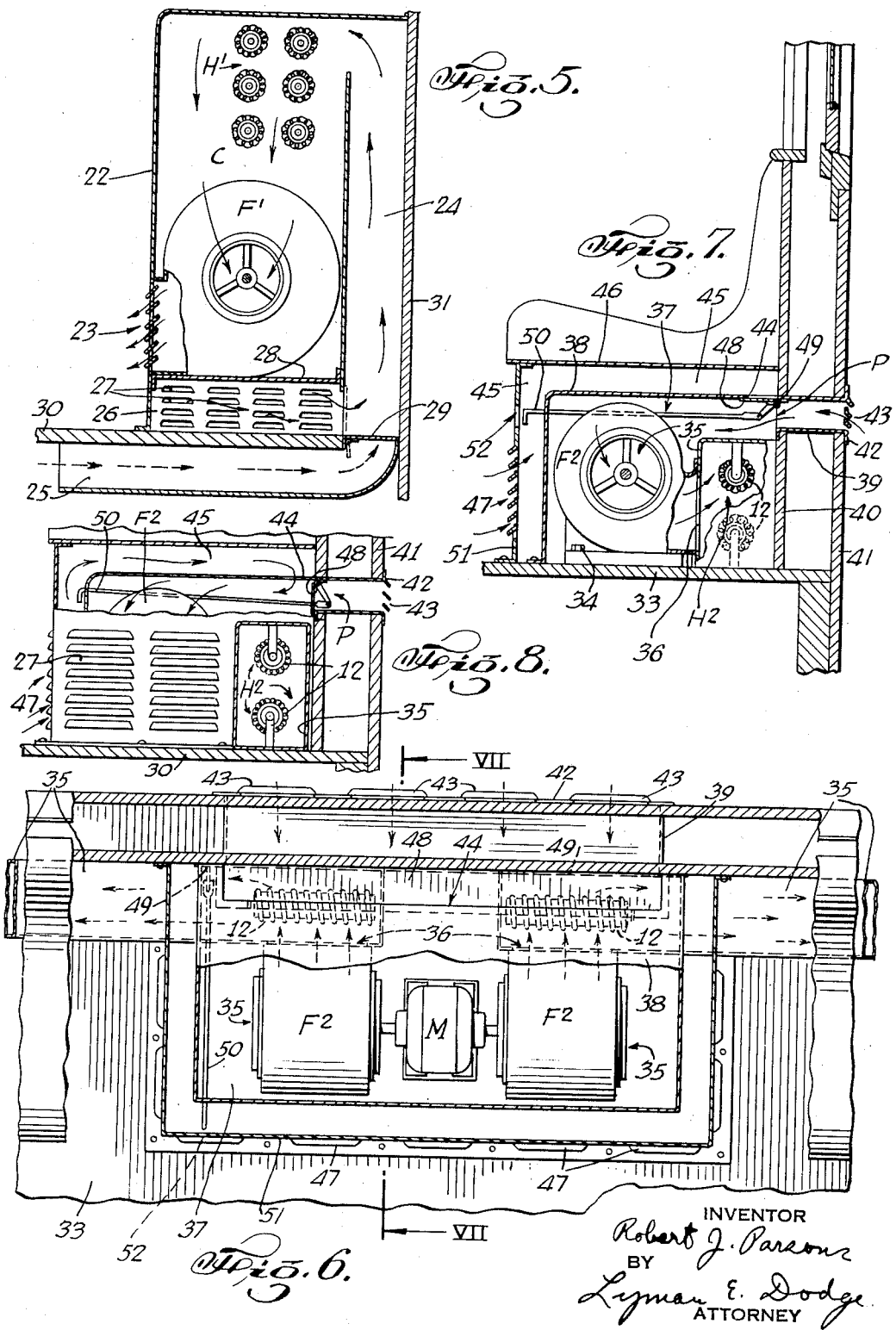

Patented Dec. 10, 1940

2,224,830

UNITED STATES PATENT OFFICE 2,224,830

VEHICLE HEATING

Robert J. Parsons, Schenectady, N. Y., assignor to Consolidated Car-Heating Company, Inc., Albany, N. Y., a corporation of New York Original application November 24, 1934, Serial No. 754,688, now Patent No. 2,126,497, dated August 9, 1938. Divided and this application July 12, 1938, Serial No. 218,807

3 Claims. (Cl. 98—14)

This invention relates to heating and ventilating means for vehicles, particularly automotive vehicles, and has for an object the provision of improved means to heat and circulate within such a vehicle a supply of air which may be drawn freshly from the outer air wholly or in part, or may be air already contained within the vehicle, which is heated and re-circulated in pursuance of the invention.

Another object of the invention is to organize the heating means and the air circulating means in such a fashion that the air to be heated and circulated may be selectively drawn from either or both of the above sources, under regulation by means readily accessible to the user of the vehicle.

Another object is to provide means by which the quantity of heated air admitted may be varied readily at will, and also by which the circulatory system may be utilized to furnish a supply of fresh air regardless of a heating operation, and while the windows of the car are closed, thus avoiding drafts and the intrusion of particles of dust, rain, etc.

Among other objects of the invention is the provision of a very compact heating and ventilating assembly which can be easily installed in a confined space within an automotive vehicle, with but little structural alterations; also the provision of an assembly having a plurality of air circulating units of individually small size but large aggregate capacity and adapted to circulate a large volume of air at low velocity when actuated by a single electric motor, thus providing for substantial economies of actuating and heating current, and for efficient distribution of the air.

Other objects and advantages will appear as the description of the particular physical embodiment selected to illustrate the invention progresses, and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Figure 1 is a view in front elevation of heating apparatus in the construction of which the invention has been embodied, and which is shown as installed upon the floor of a vehicle, of which a part is shown in vertical section; Fig. 2 is a view of the same in vertical section on the line II—II of Fig. 1, the arrows at the ends of the line indicating the direction in which the section is viewed; Fig. 3 is a view in horizontal section taken on the irregular line III—III of Fig. 2, looking in the direction indicated by the arrows at the ends of the line; Fig. 4 is a view in side elevation, partly in section, looking from left to right, Fig. 1; Fig. 5 is a view, similar to Fig. 2, illustrating a modification; Fig. 6 is a view in horizontal section of another modification with associated parts of the car and air ducts; Fig. 7 is a view in vertical section taken on the line VII—VII of Fig. 6, the arrows at the ends of the line indicating the direction in which the view is taken; Fig. 8 is a fragmentary detail view similar to Fig. 7, showing the controlling damper in a different operative position.

The reference character 1 designates a supporting base for a heater, formed of sheet metal and secured by screws 2 to the floor 3 of an automotive vehicle. The base is shown as having a raised portion 4 (see Fig. 2), serving to aid in positioning a sheet metal casing 5 which has a register or outlet 6 comprising a vane positioned to deflect the flow of air downward toward the floor in the interior of the car.

The casing 5 encloses a main compartment C, to be described, and is held in place by screws 8 at the inner end of its top wall 16 which is suitably placed to enclose an orifice 9 in the side wall 10 of the car, along which extends a duct 11 through which a supply of fresh air, derived from a desirably remote region, may be drawn into the casing, along the path indicated by the arrows.

Upon its entrance through the inlet orifice 9 the supply of air passes first over a suitable heating element designated generally by the reference character H, and comprising, in the instance illustrated, a group of electrical heater members 12, mounted on the side walls 50 of the casing, the circulation being effected by a fan F which draws in the heated air from the enclosure through side openings 13 and forces it through the register 6, opposite to which is the mouth of the fan, the fan as a whole being supported upon the base 4, as is also the electric motor 14 by which the fan is driven.

In pursuance of the invention, the casing is formed at its rear face with a wall 15 which is spaced from the adjacent portion of the side wall of the car to enclose a compartment 17 which serves as an air-feed compartment, extending from side to side of the casing and is in communication with the interior of the car by means of upright louvres 18.

At the top of the chamber 17 is hinged a damper 19 which may lie flat upon the upper end of the compartment 17 serving to close the same while leaving the inlet 9 open for entry of outer air, as in Fig. 2; or may be swung upward, as shown in Fig. 4, to close the inlet 9, in which event the air within the car is drawn in through the louvres 18 and passes into the main compartment C from the air-feed compartment 10 through its upper end 20, now open, to be heated by the element H and recirculated in the manner indicated by the arrows in Fig. 4.

These movements of the damper may be effected by a readily accessible device 21 of suitable construction to permit the damper to be set in either of its extreme positions, or in any selected intermediate position which may provide for a desirable mixture of fresh and recirculated air.

Obviously the air heating and circulating arrangements above described may be installed in any available space of an automotive vehicle, as for example under the seat of a car, or above the luggage racks commonly found in buses and the apparatus may be organized on a horizontal axis as well as in the vertical arrangement shown. Nor is it essential to the invention that the apparatus be installed within a vehicle, as it may be found more convenient to utilize available space outside the vehicle walls.

It is to be understood that well known and suitable controlling means will be provided to regulate the speed of the fan, and the degree of heat furnished by the heating element, such controllers not being shown, as they are of well known construction and mode of operation.

If the heater is not energized, the fan may be operated for ventilation alone. Conversely if the heater only be energized, a mild heat will be obtained with a certain amount of circulation due to convection, and/or to the movement of the vehicle.

The above arrangements illustrated and described with reference to Figs. 1 to 4 inclusive are merely illustrative, and many modifications may be substituted to meet the exigencies of particular installations, without departing from the spirit of the invention.

As an example of such possible modification, Fig. 5 illustrates a form of construction which embodies a fan element F' and a heating element H' enclosed in a main compartment C formed by a casing 22 with register 23 and a rear air-feed compartment 24, which are combined and cooperate in a manner similar to that already disclosed. In this modification, however, the fresh supply of air is derived from a duct 25 placed below the floor of the vehicle, and recirculation of air contained within the vehicle is provided for by forming the air-feed compartment in part as a compartment 26 with side louvres 27 in the base below the partition 28 on which the fan F' is supported.

A damper 29 functions selectively like the damper 19, already described, to provide for recirculation of air, as in the position shown in Fig. 5, or to admit fresh air from the duct 26 in any desired quantity, either as the sole source of air to be circulated, or in any desired proportions with recirculated air. In Fig. 5, the floor of the car is designated by the reference character 30 and the side wall by 31.

In Figs. 6, 7 and 8, another modification is illustrated, particularly adapted for use in the confined space under a car seat, but susceptible of utilization elsewhere, especially where a very compact organization is desired.

This modification differs from those already described in that the indrawn air passes first through the fans $F^2$, secured to the floor 33 by bolts 34, and is thence forced through the heating element $H^2$, the members 12 of which are mounted upon the top and bottom walls of a duct 35 extending along the floor 33 and which conveys the heated air to any suitable region of the car.

In the instance illustrated there are two of the fans $F^2$, driven by a common motor each delivering air to the duct 35 through an orifice 36 and both fans are contained in a compartment 37 formed by a sheet metal casing 38 having an elongated port P which derives a supply of fresh air through a duct 39 passing through the double side walls 40, 41, this duct having a closure plate 42 with several louvre openings 43. The casing 38 also has a port 44 in communication with an open space 45 which extends beneath the seat 46 and downward in front, being provided with a louvre 47 through which is admitted air from the car.

A damper 48, like those already described, is hinged at 49 in position to close either the port P or the port 44 at the will of the user, who adjusts the damper by manipulating a rod 50 extending toward the front partition 51, in which is formed a hand hole 52 affording easy access to this damper rod. In Fig. 7 the damper 48 is shown in position to clear the port P for admission of fresh air, and in Fig. 8 the damper is shown as closing the port P and clearing the port 44 for admission of air from the space 45. The damper 48 can be set in any intermediate position to effect the desired comingling of fresh and recirculated air.

An assembly of this type is well adapted for installation under the relatively long rear seat of a bus or the side seat of a street car.

Such assemblies of heating and air circulating elements embodying the invention in any of the illustrative forms discloses, or in equivalent forms of structure modified to suit particular installations, constitute very compact units which can be easily installed with but little structural changes in the vehicle, and afford extremely flexible means for heating and/or ventilating the vehicle in an efficient and economical manner.

The last described assembly presents a notable advantage, in that by the provisions of two fan elements, working in parallel, a single motor can be used with greater economy than two units each comprising a fan and motor; also it is possible to provide, within a relatively confined space, for the heating and circulation of an extremely large volume of air rapidly when desired, and also to circulate a satisfactorily large volume of air with lower velocity, which is not only desirable from the viewpoint of avoiding drafts, with the physical discomforts attendant thereupon, but is also desirable from the viewpoint of economy, both in consumption of current by the motor and by the heating elements, a lesser quantity of heat being sufficient to raise the temperature of the incoming air to optimum heating effect when the current of air is moving slowly over the heating elements than when it passes at greater velocity. Furthermore, the spacing apart of the fans aids in the more uniform ventilation of the vehicle by introducing the fresh air at spaced regions. The heat developed by the motor as well as that of the heating elements, being confined within the metal casing 38, tends to heat the latter, and the large superficial area of the casing contributes to the total heating action on the air under treatment, by pre-heating the air as it enters through compartment 45.

A gentle heat is also imparted to the seat 46, which contributes to the comfort of passengers.

This application is a division of application Serial No. 754,688, filed November 24, 1934, now Patent No. 2,126,497 dated August 9, 1938.

Although I have particularly described one particular physical embodiment of my invention and explained the operation, construction and principle thereof, nevertheless, I desire to have it understood that the form selected is merely illustrative, but does not exhaust the possible physical embodiments of the idea of means underlying my invention.

What I claim as new and desire to secure by Letters Patent of the United States is:

1. In a vehicle, in combination, the vehicle having a floor wall and a side wall, with an inlet for the admission of fresh air through one of said walls, a heating and ventilating assembly comprising a heating element, a fan, a motor for driving said fan, a casing having a main compartment enclosing said heating element, fan and motor, and having an air delivery opening near its bottom for delivery of air laterally to said vehicle, and also having an air feed compartment adapted to receive air from the interior of said vehicle, a plurality of ports communicating respectively with said fresh air inlet and with said air feed compartment, and a damper adapted to control the admission to said first named compartment of supplies of air through said ports selectively, said air in transit being concentrated directly upon said heater element both when said air is derived exclusively from either source thereof, and when it is derived from both sources and comingled prior to said heating, and the casing having one wall spaced from an adjacent wall of said vehicle to form the said air feed compartment between said casing wall and vehicle wall.

2. In a vehicle, in combination, the vehicle having a floor wall and a side wall, with an inlet for the admission of fresh air through one of said walls, a heating and ventilating assembly comprising a heating element, a fan, a motor for driving said fan, a casing having a main compartment enclosing said heating element, fan and motor, and having an air delivery opening near its bottom for delivery of air laterally to said vehicle, and also having an air feed compartment adapted to receive air from the interior of said vehicle, a plurality of ports communicating respectively with said fresh air inlet and with said air feed compartment, and a damper adapted to control the admission to said first named compartment of supplies of air through said ports selectively, said air in transit being concentrated directly upon said heater element both when said air is derived exclusively from either source thereof, and when it is derived from both sources and comingled prior to said heating and having said air feed compartment formed in part at least between the rear wall of said casing and the adjacent side wall of said vehicle.

3. In a vehicle, in combination, the vehicle having a floor wall and a side wall, with an inlet for the admission of fresh air through one of said walls, a heating and ventilating assembly comprising a heating element, a fan, a motor for driving the fan, a casing having a main compartment enclosing said heating element, fan and motor and having an air delivery opening near its bottom for delivery of air laterally to said vehicle, and also having an air feed compartment adapted to receive air from the interior of said vehicle, a plurality of ports communicating respectively with said fresh air inlet and with said air feed compartment, and a damper adapted to control the admission to said first named compartment of supplies of air through said ports selectively, said air in transit being concentrated directly upon said heater element both when said air is derived exclusively from either source thereof and when it is derived from both sources and comingled prior to said heating, and having said air feed compartment formed in part at least between the rear wall of said casing and the adjacent side wall of said vehicle and by having another portion of said feed air compartment formed within the base of said casing, said vehicle having a duct below its floor wall for admission of fresh air to said air feed compartment.

ROBERT J. PARSONS.